United States Patent
Watanabe et al.

(10) Patent No.: US 10,852,583 B2
(45) Date of Patent: Dec. 1, 2020

(54) LIGHTING DEVICE, DISPLAY DEVICE, AND METHOD OF PRODUCING LIGHTING DEVICE

(71) Applicant: SHARP KABUSHIKI KAISHA, Sakai (JP)

(72) Inventors: Hisashi Watanabe, Sakai (JP); Hirotoshi Yasunaga, Sakai (JP); Youzou Kyoukane, Sakai (JP); Takeshi Masuda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/567,305

(22) Filed: Sep. 11, 2019

(65) Prior Publication Data
US 2020/0089057 A1    Mar. 19, 2020

Related U.S. Application Data

(60) Provisional application No. 62/732,217, filed on Sep. 17, 2018.

(51) Int. Cl.
*G02F 1/13357* (2006.01)
*F21V 8/00* (2006.01)

(52) U.S. Cl.
CPC ..... *G02F 1/133605* (2013.01); *G02B 6/0055* (2013.01); *G02B 6/0068* (2013.01); *G02F 1/133603* (2013.01)

(58) Field of Classification Search
CPC ................ G02B 6/0055; G02B 6/0068; G02F 1/133603; G02F 1/133605; G02F 1/133615; F21V 7/22
See application file for complete search history.

(56) References Cited

U.S. PATENT DOCUMENTS

| 7,997,771 B2 * | 8/2011 | Epstein | G02B 3/0056 |
| | | | 362/339 |
| 9,933,140 B2 * | 4/2018 | Fujikawa | G02F 1/133605 |
| 2007/0189011 A1 * | 8/2007 | Song | G02F 1/133603 |
| | | | 362/294 |
| 2012/0212976 A1 * | 8/2012 | Chen | G02F 1/133603 |
| | | | 362/609 |

(Continued)

FOREIGN PATENT DOCUMENTS

JP    2018-018711 A    2/2018

*Primary Examiner* — Peggy A Neils
(74) *Attorney, Agent, or Firm* — ScienBiziP, P.C.

(57) ABSTRACT

A lighting device includes light sources, a light source substrate, and a reflection sheet. The light source substrate includes a plate-shaped base including a mounting surface on which mounting portions are formed. The light sources are mounted on the mounting portions with solders. The reflection sheet includes an insulating sheet, a reflection layer, and holes. The reflection layer includes a metal thin film stacked on the insulating sheet. The holes are drilled through the reflection layer and the insulating sheet at positions corresponding to the light sources so that the light sources are exposed through the holes. The light source substrate and the reflection sheet are bonded together with an adhesive layer. The insulating sheet is made of a material having a heat resistance higher than a melting temperature of the solders and an elastic modulus lower than that of the base of the light source substrate.

13 Claims, 13 Drawing Sheets

(56) References Cited

U.S. PATENT DOCUMENTS

2012/0243261 A1* 9/2012 Yamamoto .......... H01L 25/0753
  362/613
2013/0271999 A1* 10/2013 Shiobara ................. C08L 83/04
  362/341

* cited by examiner

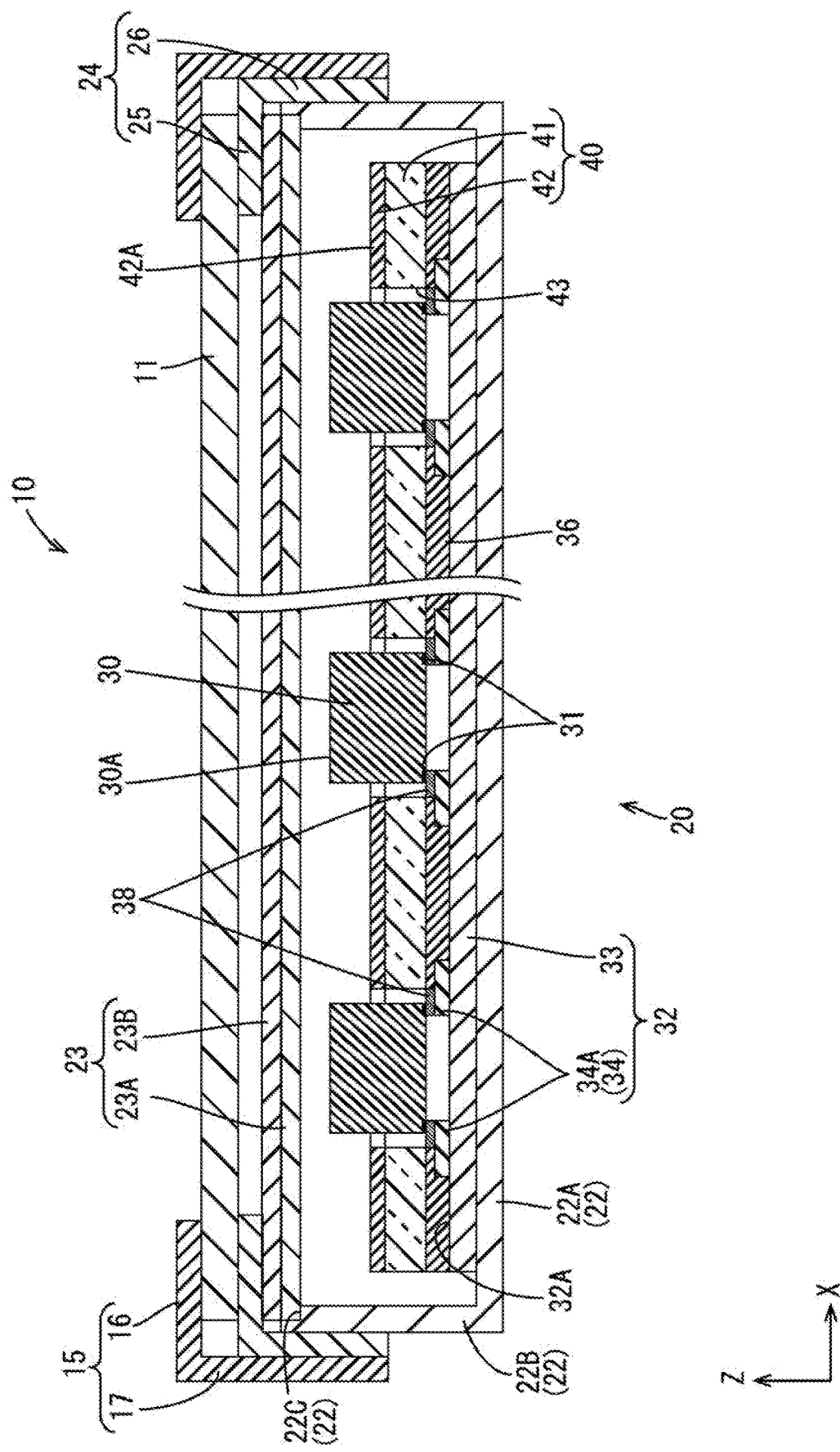

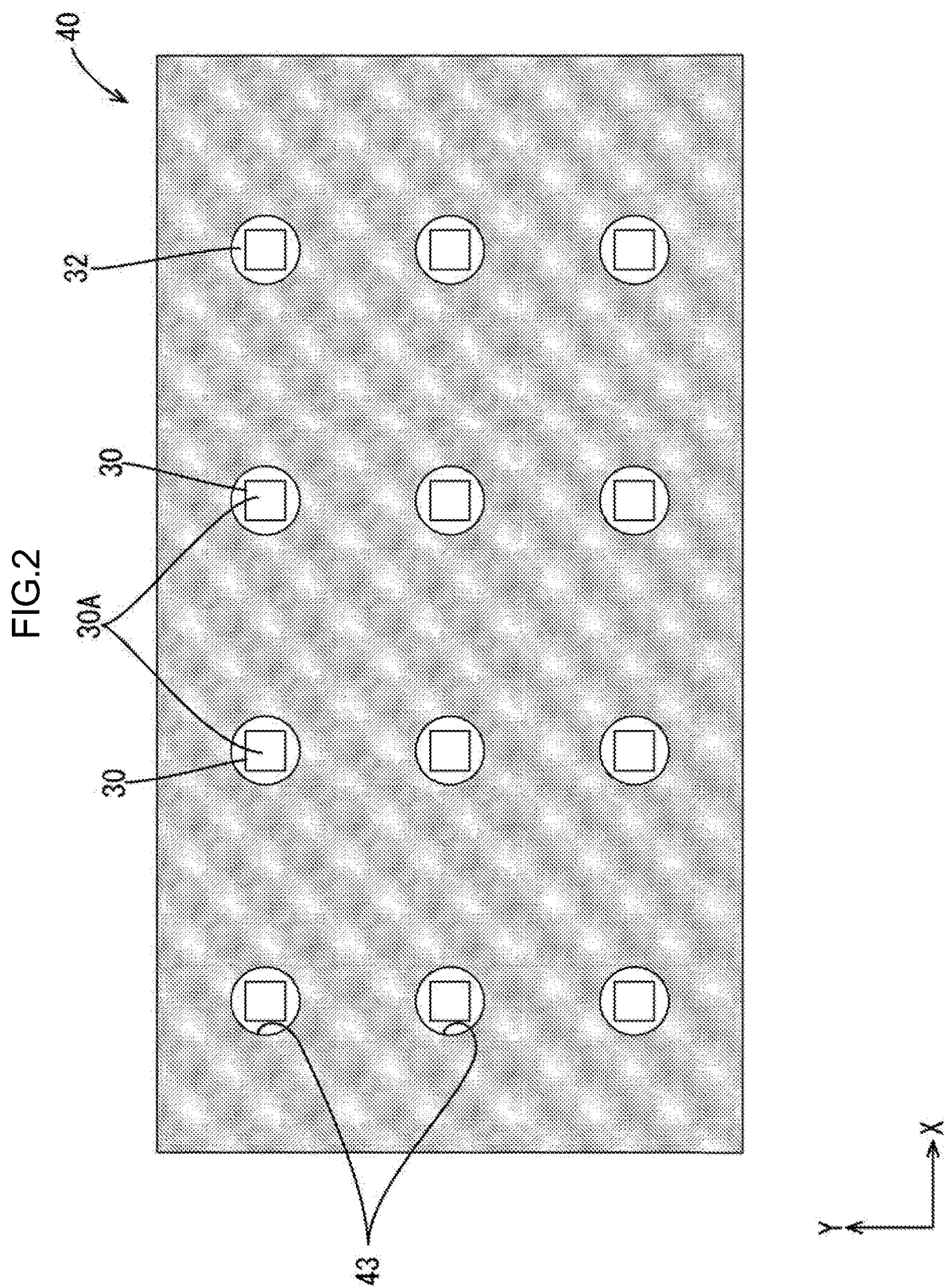

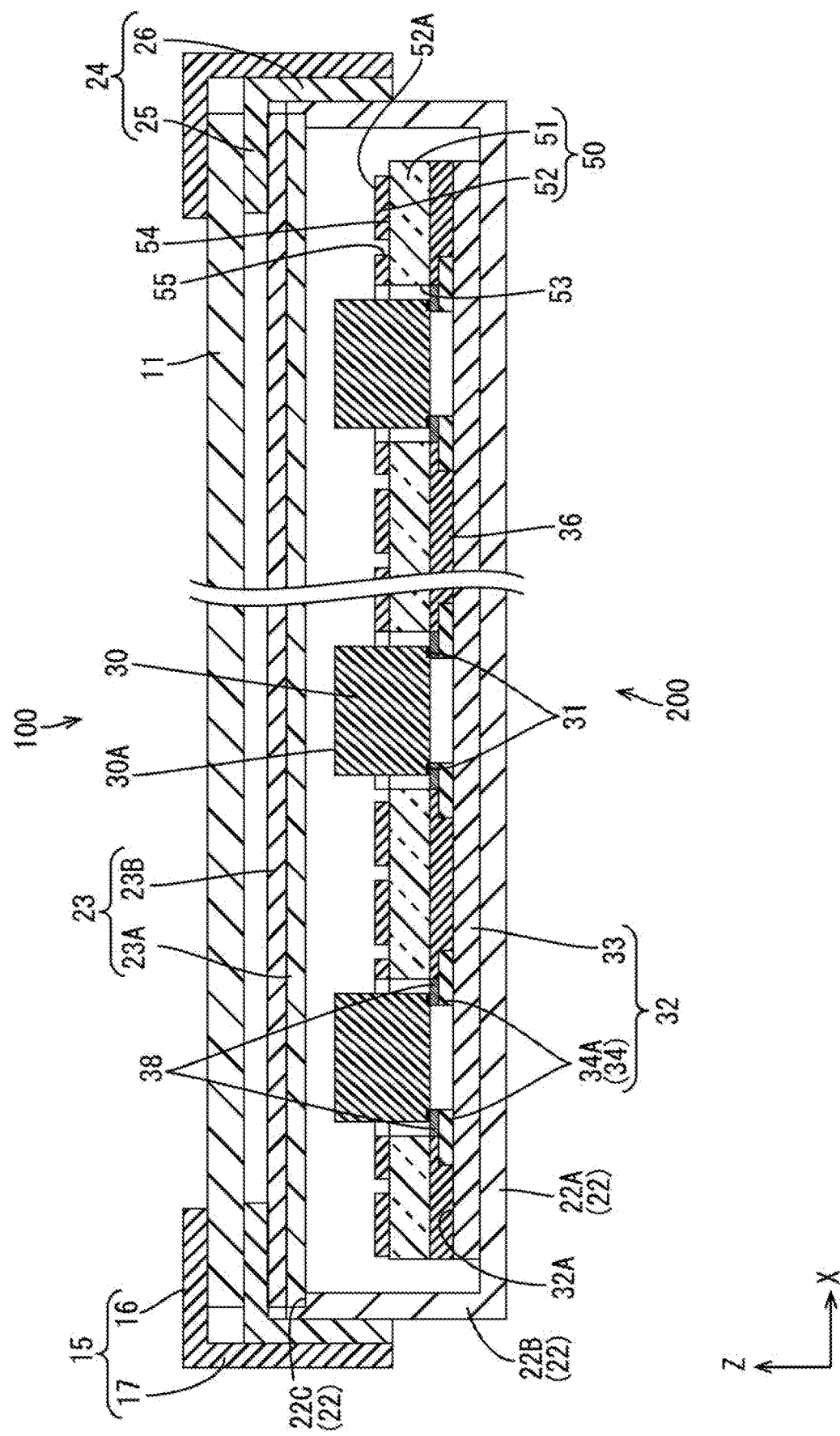

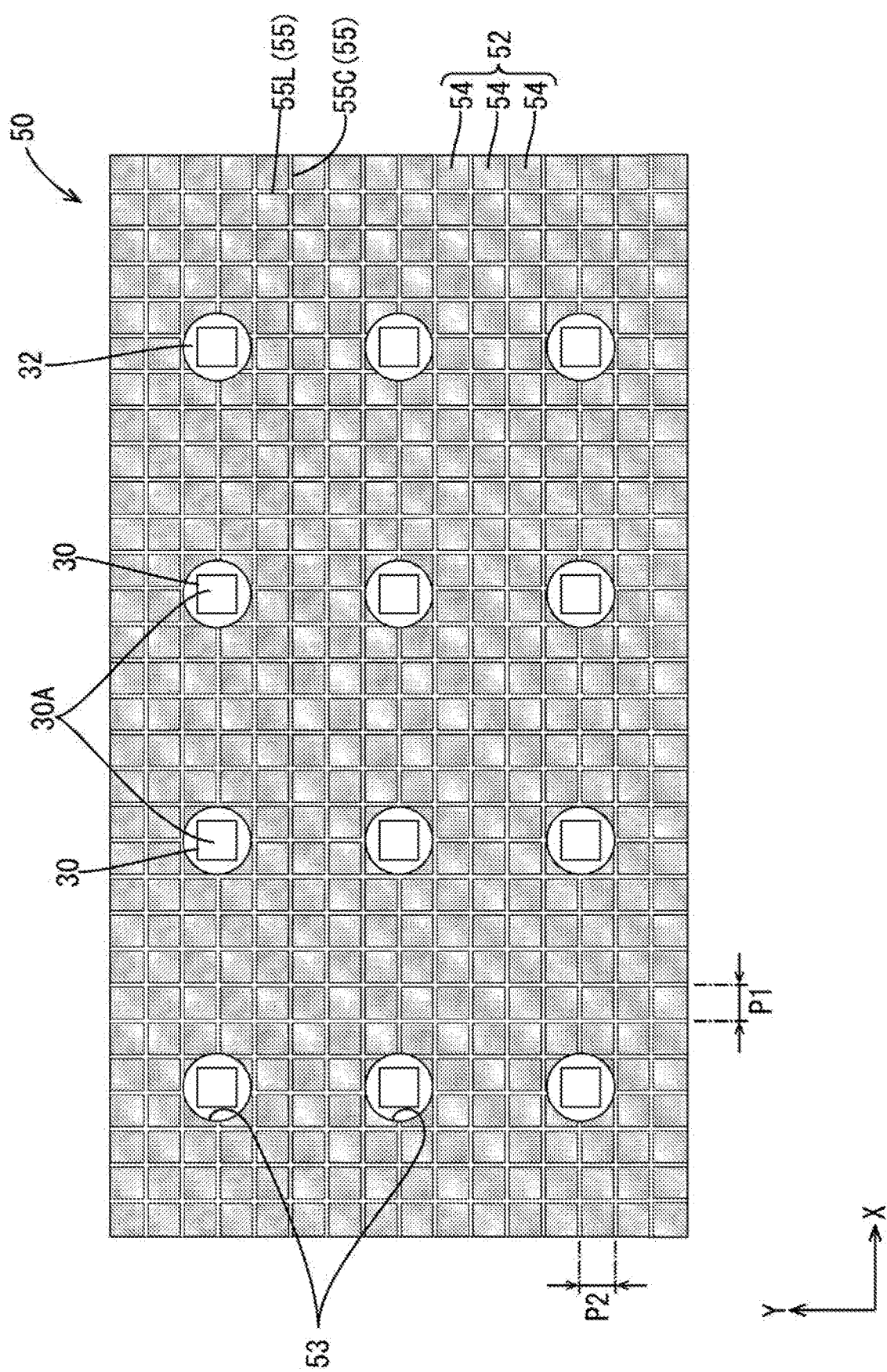

LIGHTING DEVICE, DISPLAY DEVICE, AND METHOD OF PRODUCING LIGHTING DEVICE

CROSS REFERENCE TO RELATED APPLICATION

This application claims priority from U.S. Provisional Patent Application No. 62/732,217 filed on Sep. 17, 2018. The entire contents of the priority application are incorporated herein by reference.

TECHNICAL FIELD

The technology described herein relates to a device, a display device, and a method of producing the lighting device.

BACKGROUND ART

Display devices that include display panels such as liquid crystal panels are used in portable information terminals, electronic devices, and television devices include display devices that include display panels. Examples of the portable information terminals include mobile phones, smartphones, and tablet-type notebook personal computers. Examples of the electronic devices include computers. In such display devices, the liquid crystal panels do not emit light and thus lighting devices, that is, backlight units are required. The backlight units include LED substrates include substrates on which conductive patterns are formed and on which LEDs are mounted through soldering.

In areas of the LED substrate, which is used in the backlight unit, other than mounting areas in which the LEDs are mounted, a coating layer may be formed to improve insulating properties and reflectivity. Alternatively, a reflection sheet including holes through which the LEDs are exposed and having higher reflectivity may be disposed on the LED substrate.

The white resist is normally formed through silk printing and thus provided with a film thickness that is not sufficient. Therefore, it is difficult to improve the reflectivity of the white resist equal to or higher than 90% Improvement of the reflectivity is expected. A reflection sheet that includes a metal reflection film having reflectivity higher than that of the white resist may be used. The metal reflection film may contact solders and cause electrical conduction within a plane of the reflection sheet. To reduce the electrical conduction, the reflection sheet needs to be accurately bonded to the LED substrate with an adhesive layer. However, a roller or a gig may not be used because they may contact the LEDs during the bonding. Therefore, accurate bonding of the reflection sheet to the substrate without air bubbles may be difficult. A tolerance of dimension of the holes in the reflection sheet needs to be set larger and thus the LED substrate or the conductive pattern having reflectivity lower than that of the reflection sheet or the white resist may be exposed resulting in a reduction in reflectivity. The reduction may cause reductions in brightness of the lighting device and the display device.

SUMMARY

The technology described herein was made in view of the above circumstances. An object is to provide a lighting device and a display device having higher brightness and a method of producing the lighting device.

A lighting device includes light sources, a light source substrate, and a reflection sheet. The light source substrate includes a plate-shaped base including a mounting surface on which mounting portions are formed. The light sources are mounted on the mounting portions with solders. The reflection sheet includes an insulating sheet, a reflection layer, and holes. The insulating sheet is made of an insulating material. The reflection layer includes a metal thin film stacked on the insulating sheet. The holes are drilled through the reflection layer and the insulating sheet in a stacking direction in which the reflection layer is stacked on the insulating sheet at positions corresponding to the light sources so that the light sources are exposed through the holes. The light source substrate and the reflection sheet are bonded together with an adhesive layer. The insulating sheet is made of a material having a heat resistance higher than a melting temperature of the solders and an elastic modules lower than that of the base of the light source substrate.

A display device includes the lighting device described above and a display panel.

A lighting device includes light sources, a light source substrate, and reflection sheet. The light source substrate includes a plate-shaped base including a mounting surface on which mounting portions are formed. The light sources are mounted on the mounting portions with solders. The reflection sheet includes an insulating sheet and a reflection layer. The insulating sheet is made of an insulating material having a heat resistance higher than a melting temperature of the solders and an elastic modulus lower than that of the base of the light source substrate. The reflection layer includes a metal thin film stacked on the insulating sheet. The reflection sheet is bonded to the mounting surface of the light source substrate. The reflection sheet includes holes drilled through the reflection layer and the insulating sheet in a direction in which the insulating sheet is stacked on the reflection layer at positions corresponding to the light sources so that the light sources are exposed through the holes. A method of producing the lighting device includes a bonding step, a solder forming step, a placing step, and a mounting step. The bonding step includes bonding of the reflection sheet to the light source substrate on which the light sources are not mounted with an adhesive. The solder forming step includes applying or printing of solders on the mounting portions exposed through the holes. The placing step includes placing of the light sources on the solders formed in the solder forming step. The mounting step includes mounting of the light sources on the light source substrate through reflow soldering. The steps are performed in sequence.

According to the present invention, a lighting device and a display device with higher brightness are provided.

BRIEF DESCRIPTION OF THE DRAWINGS

FIG. 1 is a side cross-sectional view of a liquid crystal display device according to a first embodiment.

FIG. 2 is a plan view illustrating a reflection sheet stacked on an LED substrate.

FIG. 4 is a side cross-sectional view of a liquid crystal display device in a second embodiment.

FIG. 5 is a plan view illustrating a reflection sheet stacked on an LED substrate.

FIG. 8E is a schematic view illustrating a step in the production process of the reflection sheet (resist removal).

DETAILED DESCRIPTION

First Embodiment

Figure 3A:
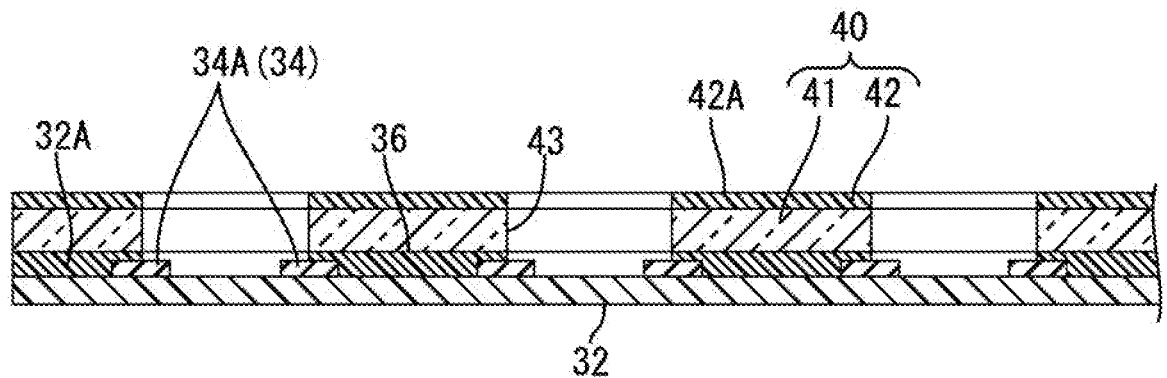
FIG. 3A is a schematic view illustrating a step in a production process of a lighting device (bonding step).

An embodiment will be described with reference to FIGS. 1 to 3C. In this embodiment section, a liquid crystal display device 10 (an example of a display device) including a liquid crystal panel 11 will be described. First, a configuration of the liquid crystal display device 10 will be described. An upper side and a lower side in FIG. 1 correspond to a front side and a rear side of the liquid crystal display device 10. A vertical direction is defined as a Z direction. A horizontal direction in FIG. 2 is defined as an X direction. A vertical direction in FIG. 2 is defined as a Y direction. For multiple components having the same configuration, only one of those components may be indicated by a reference symbol and others may not be indicated by the reference symbol.

Liquid Crystal Display Device 10

The liquid crystal display device 10 has a rectangular shallow box shape as a whole. The liquid crystal display device 10 includes the liquid crystal panel 11 (an example of a display panel) and a backlight unit 20 (an example of a lighting device). The liquid crystal panel 11 is configured to display images. The backlight unit 20 is disposed behind the liquid crystal panel 11 and configured to supply light to the liquid crystal panel 11 for image display. The liquid crystal panel 11 and the backlight unit 20 are held together by a bezel 15 having a frame shape. The liquid crystal display device 10 according to this embodiment may be used for a television device.

Liquid Crystal Panel 11

The liquid crystal panel 11 has a known configuration in detail. The configuration includes two substrates each having rectangular shapes bonded together with a predefined gap therebetween and a liquid crystal layer between the substrates. The substrates include glass substrates, respectively. Each of the glass substrates may be non-alkaline glass having high light transmissivity. Multiple films are stacked on each of the glass substrates through known photolithography.

One of the substrates on the rear side (the lower side in FIG. 1) is an array substrate that includes switching components (i.e., TFTs) connected to source lines and gate lines that are perpendicular to each other, pixel electrodes that are connected to the switching components, and an alignment film. The other one of the substrates on the front side (the upper side in FIG. 1) is a CF substrate that includes color filters, a common electrode, and an alignment film. The color filters include red (R), green (C), and blue (B) color portions arranged in a predefined pattern. Image data and various control signals required for displaying images are supplied to the source lines, the gate lines, and the common electrode by a control circuit board. Polarizing plates are disposed on outer surfaces of the substrates. The liquid crystal panel 11 displays imaged using the light supplied by the backlight unit 20. The front side of the liquid crystal panel 11 is a light exiting side.

Bezel 15

The bezel 15 is made of metal such as aluminum. The bezel 15 has a rectangular frame shape as a whole. As illustrated in FIG. 1, the bezel 15 includes a panel holding portion 16 and a periphery portion 17. The panel holding portion 16 holds an outer edge portion of the liquid crystal panel 11 for an entire perimeter from the front side. The periphery portion 17 protrudes from a peripheral edge portion of the panel holding portion 16 to the rear side to surround the outer periphery of the backlight unit 20 (a periphery portion 26 of a frame 24, which will be described later). The liquid crystal panel 11 is the bezel 15 sandwiched between the bezel 15 and the backlight unit 20 and held.

Backlight Unit 20

As illustrated in FIG. 1, the backlight unit 20 (an example of a lighting device) includes a chassis 22, an optical member 23, and the frame 24. The chassis 22 has a box shape with an opening on the liquid crystal panel 11 side. The optical member 23 is disposed to cover the opening of the chassis 22. The frame 24 is disposed along outer edges of the chassis 22 so that an outer edge portion of the optical member 23 is sandwiched between the chassis 22 and the frame 24.

In the chassis 22, LEDs 30 are disposed at positions directly behind the optical member 23 (the liquid crystal panel 11) to be opposed to the optical member 23 and an LED substrate 32 on which the LEDs 30 are mounted are disposed. The backlight unit 20 in this embodiment is a direct backlight. The LED substrate 32 is held at a predefined position by a holding mechanism. Next, the components of the backlight unit 20 will be described.

Chassis 22

The chassis 22 is prepared from an aluminum sheet or an electrolytic zinc-coated steel sheet (SECC). The chassis 22 has a shallow box shape (a shallow tray shape) as a whole with an opening on the front side. The chassis 22 includes a bottom plate 22A and side plates 22B. The bottom plate 22A has a horizontally-long rectangular shape similar to the shape of the liquid crystal panel 11. The side plates 22B project from outer edges of the bottom plate 22 toward the front side (the light exiting side, the side on which the LEDs 30 are disposed), respectively. Inner portion of distal ends of the side plates 22B are cut out so that the distal ends form L shapes and receiving portions 220 on which ends of the optical member 23 are placed. The optical member 23 placed on the receiving portions 22C of the chassis 22 are held by the frame 24 from the front side.

Optical Member 23

The optical member 23 is for converting light emitted by the LEDs 30 into uniform planar light. The optical member 23 has a horizontally-long rectangular shape similar to the shapes of the liquid crystal panel 11 and the chassis 22 in a plan view. As illustrated in FIG. 1, the outer edges of the optical member 23 are placed on the receiving portions 220 so that the optical member 23 covers the opening of the chassis 22. The optical member 23 is disposed between the liquid crystal panel 11 and the LEDs 30 (the LED substrate 32).

More specifically, the optical member 23 is disposed opposite on the front side relative to the LEDs 30, that is, on the light exiting side with a predetermined distance away from the LEDs 30. The optical member 23 in this embodiment includes a diffuser plate 23A on the rear side (the LED 30 side) and an optical sheet 23B on the front side (the liquid crystal panel 11 side, the light exiting side). The diffuser plate 23A includes a base made of substantially transparent resin and formed in a plate shape with a predefined thickness and diffuser particles disposed in the base. The diffuser plate 23A has a function of diffusing light that passes through the diffuser plate 23A. The optical sheet 23B includes sheets having a thickness smaller than the thickness of the diffuser plate 23A. The sheets included in the optical member 23 may be selected from a fluorescence emission sheet, a diffuser sheet, a prism sheet, and a polarized reflection sheet where appropriate.

Frame 24

The frame 24 is made of resin such as white polycarbonate having higher reflectivity. The frame 24 includes a sheet holding portion 25 and the periphery portion 26. The sheet holding portion 25 has a frame shape along the outer edge portion of the optical member 23 to sandwich the edges of the optical member 23 with the receiving portions 22C of the chassis 22. The periphery portion 26 projects from an outer edge portion of the sheet holding portion 25 toward the rear side to surround the side plates 22B of the chassis from the outer periphery. The sheet holding portion 25 receives the edges of the liquid crystal panel 11 from the rear side. The edges of the liquid crystal panel 11 are sandwiched between the panel holding portion 16 of the bezel 15 on the front side and the sheet holding portion 25 (see FIG. 1).

LEDs 30

The LEDs 30 are mounted on the LED substrate 32. Light emitting surfaces 30A of the LEDs 30 face an opposite side from the LED substrate 32, which will be described later. Namely, the LEDs 30 are top-emitting LEDs. The light emitting surfaces 30A of the LEDs 30 are opposed to the plate surface of the optical member 23. Each LED 30 includes an LED chip (an LED component), which is a semiconductor light emitting component, sealed by resin material on a substrate that is disposed on the plate surface of the LED substrate 32. The LED chip mounted on the substrate is configured to have one kind of main light emission wavelength, specifically, to emit light in a single color of blue. The resin material that seals the LED chip contains phosphors that emit a predefined color of light when excited by the blue light emitted by the LED chip. The phosphors are dispersed in the resin material. Therefore, substantially white light is emitted. An LED that includes a sealing resin material that does not contain phosphors may be used. Alternatively, an LED chip may be mounted without sealed by the resin material. Because the LED emits blue light, the fluorescent emission sheet may be required for the optical sheet 23B so that white light is emitted.

The LEDs 30 in this embodiment use the flip-chip packaging technology. Each LED 30 includes two electrodes 31 disposed on a surface opposed to the LED substrate 32.

LED Substrate 32

As illustrated in FIG. 1, she LED substrate 32 (an example of a light source substrate) has a horizontally-long rectangular shape similar to the shape of the bottom plate 22A of the chassis 22. The LED substrate 32 is disposed to extend along the bottom plate 22A and held in the chassis 22. The LED substrate 32 is insulated from the chassis 22. The LED substrate 32 includes a base 33 made of an insulating material having an elastic modulus higher than that of a reflection sheet 40, which will be described later. Examples of the material include glass epoxy and aluminum. A conductive pattern 34 is formed on a surface of the LED substrate 32 opposed to the optical member 23 (an upper surface in FIG. 1, hereinafter referred to as a mounting surface 32A). The conductive pattern 34 is prepared from a metal film such as a copper foil and insulated from the base 33.

A preferable thickness of the LED substrate 32 (the base 33) is 0.2 mm or greater. This is because the LED substrate 32 may be easily curved during handling and the LEDs may be easily removed from the LED substrate 32 if the thickness of the LED substrate 32 is less than 0.2 mm, especially, if the LEDs 30 are small in size and mounting strengths are lower.

The LEDs 30 having the configuration described earlier are mounted on the conductive pattern 34 using the flip-chip packaging technology. Specifically, the electrodes of each LED 30 are electrically connected to the corresponding electrode pads 34A (an example of mounting portions) of the conductive pattern 34 with solders 38 (illustrated only in the plan view). Driving power is supplied to the LEDs 30 by an LED driver circuit board (a light source driver circuit board) connected to the conductive pattern 34.

As illustrated in FIG. 2, the LEDs 30 are arranged along the long edge (the X direction) and the short edge (the Y-axis direction) of the LED substrate 32. Specifically, four along the X direction by three along the Y-axis direction, that is, twelve LEDs 30 are arranged in a matrix. Intervals of the LEDs 30 are constant (equal) in the X direction and the Y-axis direction within a range from 1.0 mm to 5.0 mm. In this embodiment, the electrodes 31 in each LED 30 are arranged in the X direction of the LED substrate 32. This embodiment is an example and the number of the LEDs may be altered according to specifications including screen sizes and required brightness.

Rays of light emitted by the LEDs 30 and returned to the LED substrate 32 are reflected by the reflection sheet 40 on the mounting surface 32A of the LED substrate 32 toward the front side and included the emitting light.

Reflection Sheet 40

The reflection sheet 40 is prepared by laminating a metal thin film (hereinafter referred to as a metal reflection layer 42) made of silver, aluminum, silver alloy, or aluminum alloy and having higher light reflectivity to one of surfaces of the insulating sheet 41 through spattering or vapor deposition. The reflection sheet 40 is overlaid on the LED substrate 32 to cover an entire are of the mounting surface 32A of the LED substrate 32 (the base 33) with the insulating sheet 41 opposed to the LED substrate 32 and bonded to the LED substrate with an adhesive layer 36. An adhesive included in the adhesive layer 36 is not limited to a specific kind but it is preferable that the adhesive has a heat resistance.

The insulating sheet 41 in the reflection sheet 40 made of a material having a high heat resistance to a melting temperature of solders, which is about 260° C., or higher and an elastic modulus lower than that of the base 33 of the LED substrate 32 (glass epoxy or aluminum). The insulating sheet 41 has a linear expansion coefficient α closer to that of the base 33 of the LED substrate 32 so that the insulating sheet 41 bonded to the LED substrate 32 is less likely to warp when heated.

Specifically, the insulating sheet 41 is made of polyimide or liquid crystal polymers. If a linear expansion coefficient of the base 33 of the LED substrate 32 is α1, a linear expansion coefficient of the insulating sheet 41 is α2, and lengths of the LED substrate (the base 33) and the insulating sheet 41 are L, a difference between the linear expansion coefficients α1 and α2, that is |α1−α2|, is smaller than $\frac{1}{200}$/L ($|α1-α2|<\frac{1}{200}/L$).

More specifically, if the LED substrate 32 has a warp equal to or larger than 1 mm, it may be difficult to mount components on the LED substrate 32. Therefore, it is preferable that the warp is within 1 mm regardless of the size. The warp occurs due to the difference between the linear expansion coefficients of the reflection sheet 40 and the LED substrate 32. The relation may be expressed as follows.

$$|α1 \times L \times \Delta T - α2 \times L \times \Delta T| < 1 \text{ mm}$$

$$|α1 \times α1| > \frac{1}{200}/L$$

From the relation, the above relation $|α1-α2|<\frac{1}{200}$/L is derived if ΔT=(220° C., which is a temperature during reflow soldering)−(20° C., which is a room temperature)= 200° C.

The reflection sheet 40 extends parallel to the bottom plate 22A of the chassis 22 and the plate surface of the optical member 23. Distances between the optical member 23 and the reflection sheet 40 in the normal direction are substantially constant within an entire area of the reflection sheet 40. With the reflection sheet 40, the rays of light returned to the LED substrate 32 are reflected toward the front side (the light exiting side, the optical member 23 side). A protective layer for reducing metal deterioration or a reflection enhancement layer for increasing the reflectivity may be formed on the metal reflection layer 42 (not illustrated).

The thickness of the metal reflection layer 42 of the reflection sheet 40 is preferably within a range from 0.05 μm to 1 μm. If the thickness is less than 0.05 μm, sufficient reflectivity cannot be achieved. If the thickness is greater than 1 μm, warp of the insulation sheet 41 may occur and it may be difficult to form fine slits 45, which will be described later.

As illustrated in FIG. 2, the reflection sheet 40 includes holes 43 that drilled through the reflection sheet 40 in a thickness direction (a stacking direction in which the metal reflection layer 42 is stacked on the insulation sheet 41). The holes 43 are located at positions corresponding to the LEDs 30 when the reflection sheet 40 is overlaid on the LED substrate 32 so that the LEDs 30 are exposed. Each hole 43 has a round shape slightly larger than a perimeter of the corresponding LED 30. End surfaces of the metal reflection layer 42 exposed in inner walls of the holes 43 (in the holes 43). Two electrodes 31 of each LED 30 disposed in the corresponding hole 43 are electrically connected to electrode pads 34A (an example of a mounting portion) of the conductive pattern 34 on the LED substrate 32 exposed in the hole 43 with solders 37.

The metal reflection layer 42 includes a reflection surface 42A on an opposite side from the LED substrate 32 (the base 33). The reflection surface 42A is positioned lower than the height of the LED substrate 32 (the base 33) from the light emitting surfaces 30A of the LEDs 30. Although the LEDs 30 are the top emitting LEDs, some mounts of light may be emitted through side surfaces. If the reflection surface 42A of the reflection sheet 40 is positioned higher than the light emitting surfaces 30A of the LEDs 30, some rays of light emitted by the LEDs 30 may enter inner walls of the holes 43 in the reflection sheet 40 and may be absorbed by the insulating sheet 41. Therefore, the metal reflection layer 42 is positioned as described above. It is preferable that the reflection sheet 40 is provided with a smaller thickness. However, if the reflection sheet 40 is too thin, it may be difficult to handle the reflection sheet 40. Therefore, it is preferable that a lower limit of the reflection sheet 40 is set to 10 μm.

Even if a protective layer or a reflection enhancement layer is provided on an outer surface (an upper surface) of the metal reflection layer 42, the reflection surface 42A is positioned lower than the height of the light emitting surfaces 30A from the LED substrate 32 (the base 33). With the configuration, a larger number of the rays of light emitted by the LEDs 30 exit toward through the protective layer or the reflection enhancement layer toward the optical member 23. Therefore, the brightness of the backlight unit 20 increases.

This embodiment has the configuration as described above. Next, a method of producing the backlight unit 20 will be described. As illustrated in FIG. 3A, the reflection sheet that includes the holes 43 at predefined positions is aligned with the mounting surface 32A of the LED substrate 32 on which the LEDs 30 are not mounted such that two electrode pads 34A are exposed through each hole 43 and bonded to the mounting surface 32A with the adhesive (the adhesive layer 36) (a bonding step). Because the LED substrate 32 is substantially flat, a general bonding machine using a roller or a jig can be used and thus they can be accurately bonded.

Figure 3B:
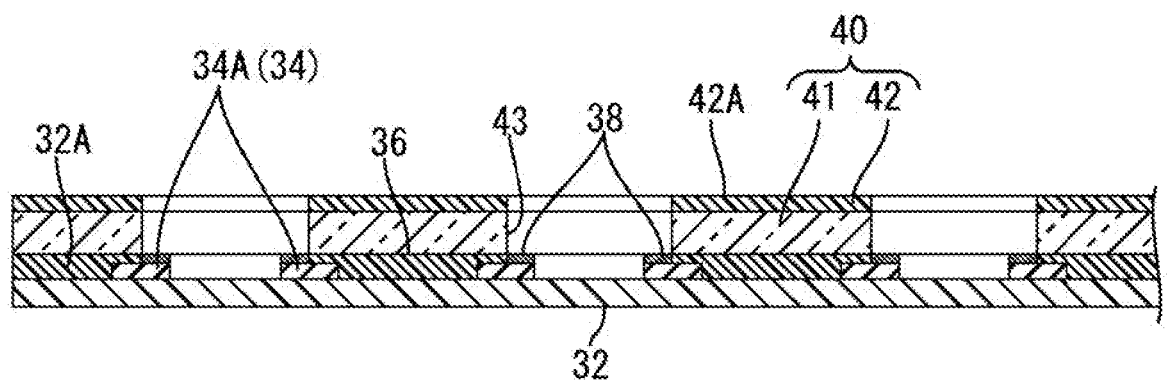
FIG. 3B is a schematic view illustrating a step is a production process of the lighting device (application step).

As illustrated in FIG. 3B, the creamy solders 38 are applied to or printed on the electrode pads 34A exposed through the holes 43 (a solder forming step).

Figure 3C:
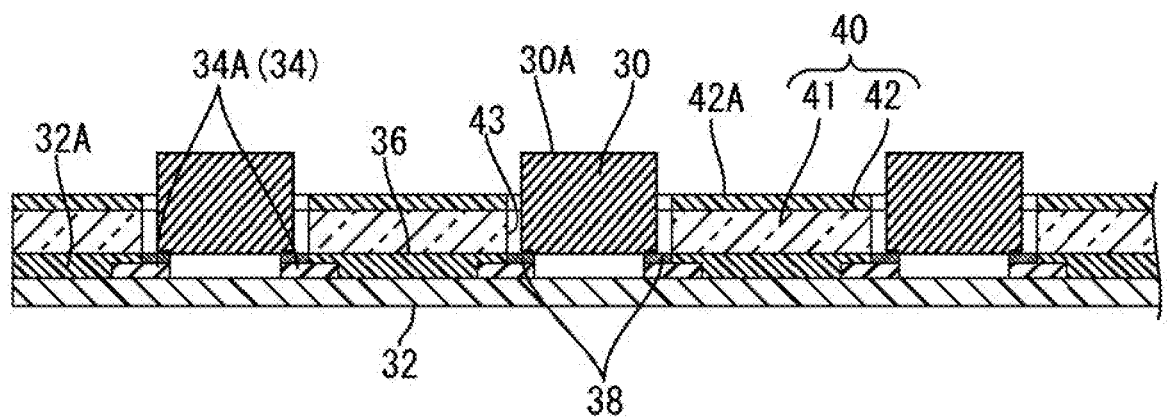
FIG. 3C is a schematic view illustrating steps in a production process of the lighting device (arrangement step/mounting step).

As illustrated in FIG. 3C, each LED 30 is placed on the LED substrate 32 such that two electrodes 31 of the LED 30 are placed on the electrode pads 34A (on the solders 38) exposed through the corresponding hole 43 (a placing step) and reflow soldering is performed (a mounting step). Through the steps, a portion of the backlight unit 20 disposed in the chassis 22 in this embodiment is completed. The components described above are assembled into the backlight unit 2. Then, the backlight unit 20 is attached to the liquid crystal panel 11.

When the liquid crystal display device 10 is turned on, the driving of the liquid crystal panel 11 is controlled by the panel control circuit on the control circuit board and the driving of the LEDs 30 on the LED substrate 32 is controlled by the LED driver circuit on the LED driver circuit board. The light from the LEDs 30 that are turned on is applied to the optical member 23 (the diffuser plate 23A and the optical sheet 23B). After predefined optical effect is deserted on the light by the optical member 23, the light is applied to the liquid crystal panel 11 and used for display of an image based on the display pixels in the liquid crystal panel 11.

Effects of the backlight unit 20 in this embodiment will be described. The backlight unit 20 in this embodiment includes the LEDs 30, the LED substrate 32, and the reflection sheet 40. The LEDs 30 are mounted on the LED substrate 32 by soldering the LEDs 30 to the electrode pads 34A formed on the mounting surface 32A of the base 33 in the plate shape with the solders 38. The reflection sheet 40 includes the insulating sheet 41 and the metal reflection layer 42. The insulating sheet 41 is made of the insulating material. The metal reflection layer 42 includes the metal thin film stacked on the insulating sheet 41. The reflection sheet 40 is stacked on the mounting surface 32A of the LED substrate 32. The reflection sheet 40 includes the holes 43 drilled through the metal reflection layer 42 and the insulating sheet 41 in the stacking direction so that the LEDs 30 are exposed through the holes 43. The LED substrate 32 and the reflection sheet 40 are bonded together with the adhesive layer 30. The insulating sheet 41 is made of the material having the heat resistance higher than the melting temperature of the solders 38 and the elastic modulus lower than that of the base 33 of the light source substrate 32.

In the backlight unit 20 having such a configuration, the insulating sheet 41 has the heat resistance higher than the melting temperature of the solders 38. Therefore, the reflection sheet 40 can be bonded to the LED substrate 32 before the reflow soldering of the LEDs 30. The LED substrate 32 before the LEDs 30 are mounted is substantially flat. Therefore, the general bonding machine using the roller or the jig can be used and thus they can be accurately bonded. The holes 43 can be provided with the smaller diameter and thus exposed areas of the LED substrate 32 and the conductive pattern 34 having the lower reflectivity through the holes 43 can be reduced so that the area of the reflection sheet 40 (the metal reflection layer 42) having the higher reflectivity is increased. Namely, the light use efficiency increases and thus the brightness of the backlight unit 20 and the liquid crystal display device 10 increases. In the backlight unit 20 having such a configuration, the LED substrate 32 and the reflection sheet 40 are bonded together with the adhesive layer 36 and thus likely to be influenced by expansion due to high temperature.

If the LEDs 30 are small in size and the mounting strengths are lower, the LED substrate 32 may curve. In this case, the LEDs 30 may be removed from the LED substrate. In the backlight unit 20 in this embodiment, the base 33 of the LED substrate 32 is made of glass epoxy or aluminum having the higher elastic modulus and thus has rigidity although it is thin. Therefore, the LED substrate 32 is less likely to curve. The insulating sheet 41 of the reflection sheet 40 is made of polyimide or liquid crystal polymers having the lower elastic modulus. Therefore, the insulating sheet 41 exerts high following performance and has the high heat resistance.

In the backlight unit 20, the difference $|\alpha1-\alpha2|$ between the linear expansion coefficient $\alpha1$ of the base 33 of the LED substrate 32 and the linear expansion coefficient $\alpha2$ of the insulating sheet 41 is smaller than $1/200/L$. According to the configuration, even if the LED substrate 32 to which the reflection sheet 40 is bonded is heated, the warp of the LED substrate resulting from the difference due to thermal expansion can be maintained small.

The LEDs 30 in this embodiment are the top emitting LEDs with the light emitting surfaces 30A facing an opposite side from the LED substrate 32. The reflection surface 42A of the metal reflection layer 42 on the opposite side from the LED substrate 32 is positioned lower than the height of the light emitting surfaces 30A from the base 33.

According to the configuration, the rays of light emitted through the light emitting surfaces 30A and the side surfaces of the LEDs 30 are less likely to be blocked by the reflection sheet 40.

Because the reflectivity of the reflection sheet 40 in the backlight unit 20 in this embodiment having such a configuration is increased, the backlight unit 20 and the liquid crystal display device 10 can be provided with the higher brightness.

Second Embodiment

A second embodiment will be described with reference to FIGS. 4 to 8. Configuration different from those of the first embodiment will be described. Configurations the same as those of the first embodiment will be indicated by the symbols the same as those of the first embodiment and will not be described.

This embodiment includes slits 55 in a metal reflection layer 52 of a reflection sheet 50. This is different from the first embodiment. As illustrated in FIG. 5, the slits 55 are arranged at equal intervals in rows and columns along the long edge (the X direction) and the short edge (the Y-axis direction) of the LED substrate 32 and continuously from a first end to a second end of the metal reflection layer 52 in an extending direction of the metal reflection layer 52. The metal reflection layer 52 is divided into square areas by the slits 55. The square areas are arranged in a grid. The areas of the metal reflection layer 52 divided by the slits 55 (areas defined by the slits 55) will be referred to as divided reflection areas 54. The adjacent divided reflection areas 54 are insulated from each other by the slits 55.

Widths of the slits 55 are preferably in a range from 3 μm to 30 μm. If the widths are less than 3 μm, electrically conductive portions may be formed depending on accuracy in slit formation and electrical insulation may be instable. If the widths are greater than 30 μm, an exposed area of the surface of an insulating sheet 51 having the lower reflectivity increases and thus overall reflectivity of the reflection sheet 50 decreases.

The slits 55 are formed in the metal reflection layer 52 such that at least one of the slits 55 is provided in each of the areas between holes 53 that are horizontally, or diagonally adjacent to each other. Namely, the holes 53 are provided in the divided reflection areas 54, respectively. Therefore, the areas between the adjacent holes 53 are electrically insulated from one another. Even if the solders 38 that electrically connect the electrodes 31 to the electrode pads 34A in the hole 43 contact the metal reflection layer 52 at two or more points of the reflection sheet 50, the areas between the holes 53 are less likely to be electrically connected to each other via the metal reflection layer 52. In this embodiment, as illustrated in FIG. 5, a pitch P1 of the vertical slits 55L arranged at equal intervals is defined in the horizontal direction (the X direction). A pitch P2 of the horizontal slits 55C arranged at equal intervals is defined in the vertical direction (the Y-axis direction). The pitches P1 and P2 are equal to each other (P1=P2).

Figure 6:
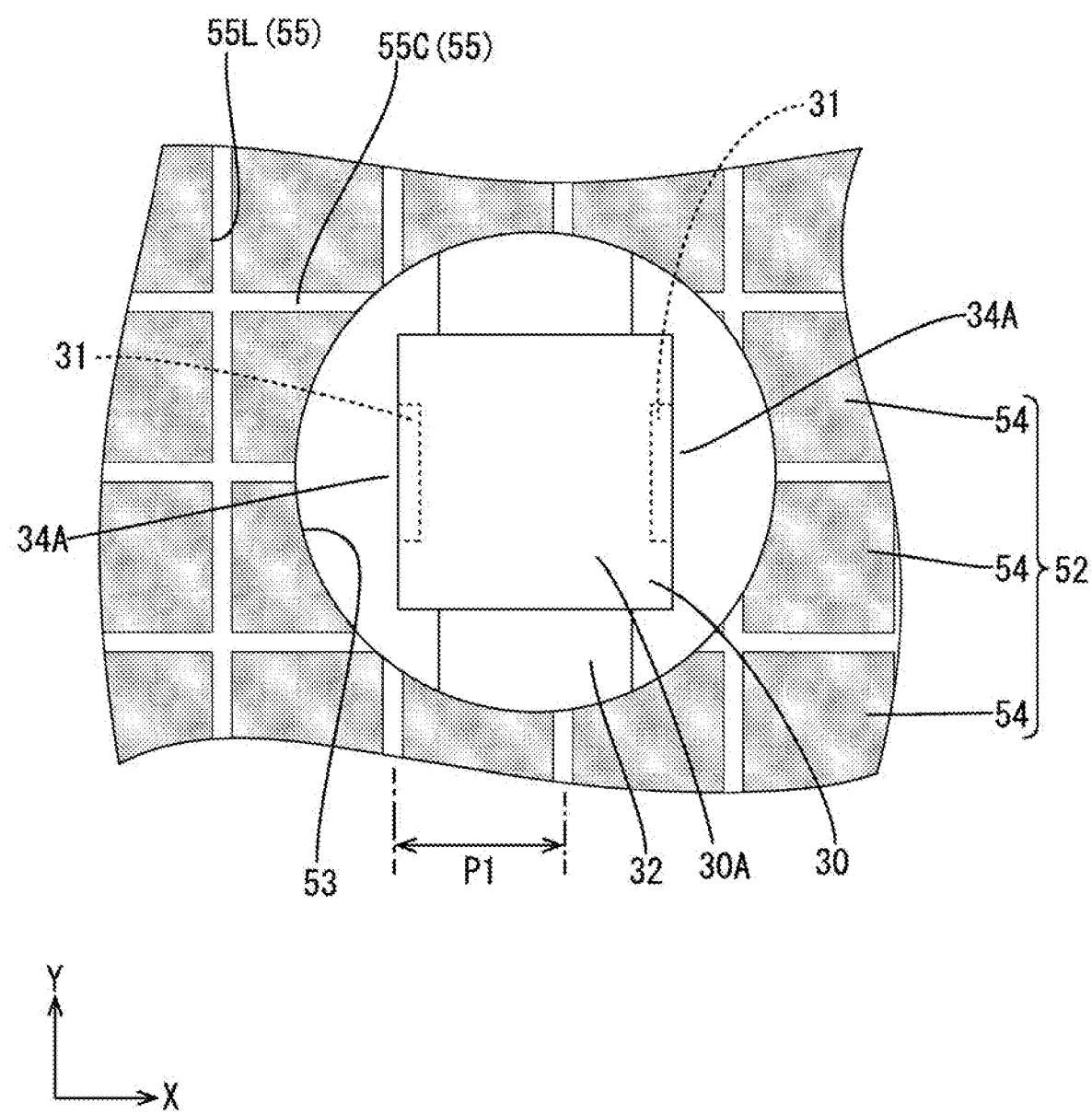
FIG. 6 is a magnified plan view of a portion of FIG. 5.

As illustrated in FIG. 6, the slits 55 are formed such that at least one extended line of the slits 55 is drawn between the electrode pads 34A in the hole 53. Namely, the electrode pads 34A disposed in the hole 53 are projected from the different divided reflection areas 54 and exposed through the hole 53 when viewed in plan. With this configuration, the electrode pads 34A are electrically insulated from each other. Even if the solders 38 at the electrodes 31 contact the metal reflection layer 52 in the hole 53, the electrodes 31 are less likely to be electrically connected to each other via the metal reflection layer 52.

According to the configuration, the electrodes 31 of the different LEDs 30 and the electrodes 31 of each LED 30 are less likely to be electrically connected to each other due to the contact of the solders 38 with the metal reflection layer 52. Therefore, the diameter of the holes 53 can be set as small as possible. Namely, the exposed areas of the LED substrate 32 and the conductive pattern 34 through the holes 53 can be reduced and thus the overall reflectivity of the reflection sheet 50 can be increased.

The pitches P1 and P2 of the slits 55 may be set in a range from 0.1 mm to 5 mm. If the pitches P1 and P2 of the slits 55 are greater than 5 mm, pitches of the holes 53 and the LEDs 30 need to be increased resulting in a reduction in brightness. Uneven brightness is more likely to occur. If the pitches P1 and P2 of the slits 55 are less than 0.1 mm, the number of the slits 55 increases and a larger area of the insulating sheet 51 having the lower reflectivity is exposed. Therefore, the brightness decreases.

Figure 7:
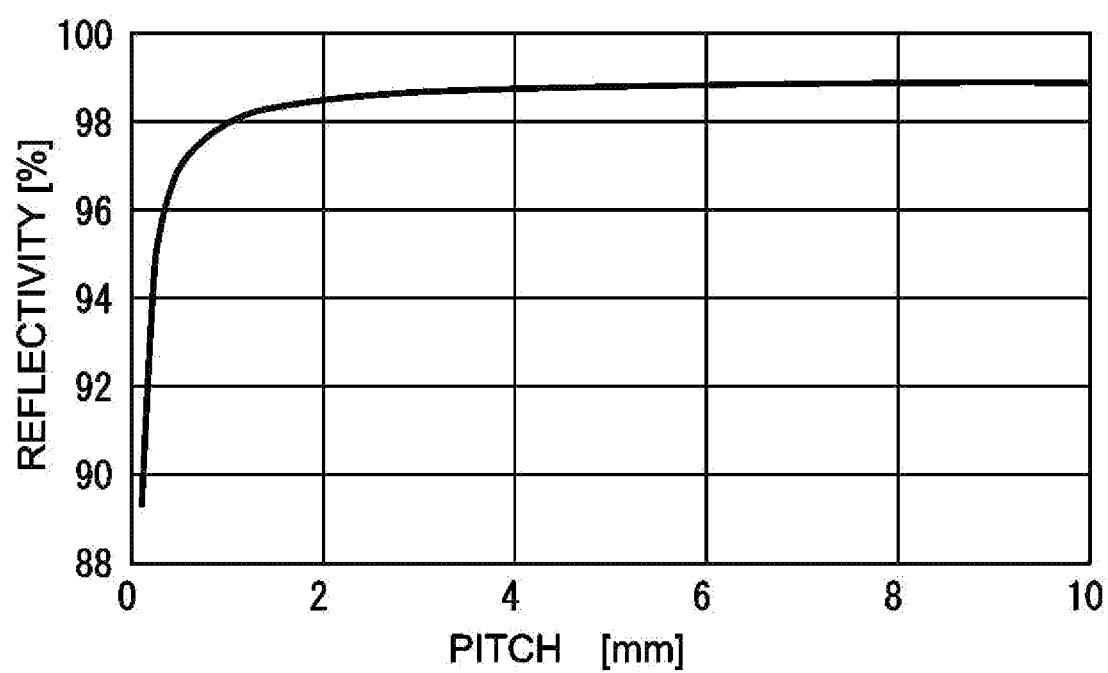
FIG. 7 is a graph illustrating a relation between pitch of slits and reflectivity.

FIG. 7 is a graph illustrating a relation between the pitch of the slits 55 and the reflectivity when the width of the slits 55 is set to 5 μm. When the pitch of the slits 55 is 0.1 mm, the reflectivity is about 90%. When the pitch is 0.1 mm or greater, effect greater than that of the white coating (the reflectivity of 90% or less) can be achieved. When the pitch is 0.5 mm or greater, the reflectivity is 97% or higher, that higher reflectivity can be achieved. When the pitch is 1.5 mm or greater, the reflectivity is 98.5% or higher, that is, a decrease in reflectivity due to the slits 55 is less likely to be observed. Therefore, it is preferable that the pitches P1 and P2 are in a range from 0.1 to 5 mm.

The configuration is as described above. Next, a method of producing the reflection sheet 50 will be described. As illustrated in FIG. 6A, the metal reflection layer 52 having higher reflectivity is formed on the surface of the insulating sheet 51 made of an insulating material such as polyimide and liquid crystal polymers through vapor deposition or spattering. The metal reflection layer 52 is made of silver, aluminum, or an alloy containing silver or aluminum.

Figure 8A:
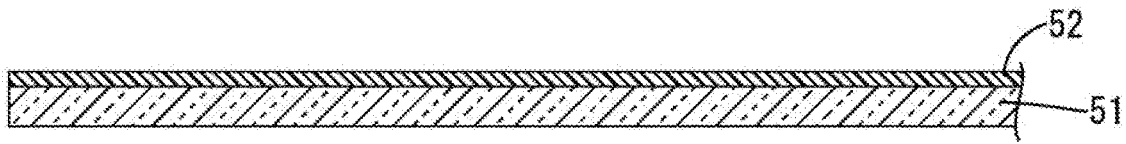
FIG. 8A is a schematic view illustrating a step in a production process of a reflection sheet (reflection layer formation).
Figure 8B:
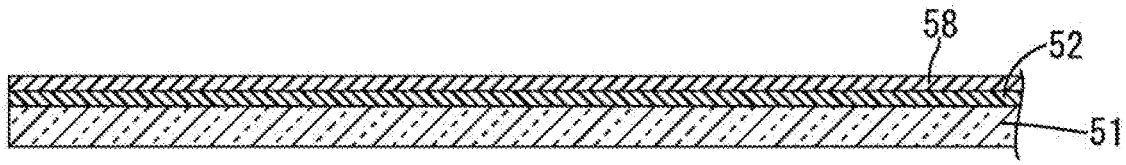
FIG. 8E is a schematic view illustrating a step in the production process of the reflection sheet (resist formation).
FIG. 8C is a schematic view illustrating a step in the production process of the reflection sheet (exposure and development).
FIG. 8D is a schematic view illustrating a step in the production process of the reflection sheet (etching).
FIG. 8F is a schematic view illustrating a step in the production process of the reflection sheet (protective layer formation).
FIG. 8G is a schematic view illustrating a step in the production process of the reflection sheet (hole formation).

Next, the slits 55 are formed in the reflection sheet 50. The slits 55 may be formed through known photolithography. As illustrated in FIG. 8B, a photoresist layer 58 is formed by evenly applying liquid photoresist to the metal reflection layer 52 through printing or a dry film resist may be bonded to the metal reflection layer 52.

Figure 8C:
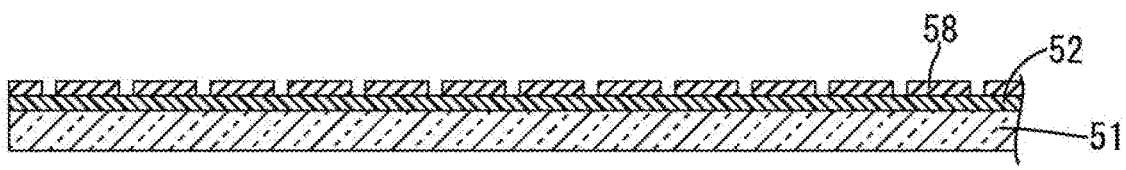

Next, the photoresist layer 58 is exposed to light with a proper wavelength via a photomask and developed to remove unnecessary portions of the photoresist layer 58 (see FIG. 8C). In this embodiment, the portions of the photoresist layer 58 are removed to form the slits 55.

Figure 8D:
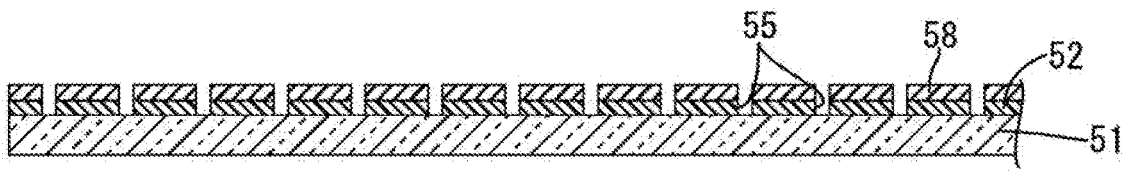
Figure 8E:
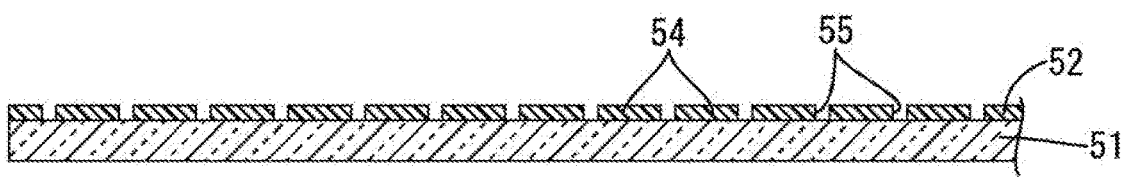

Next, as illustrated in FIG. 8D, portions of the metal reflection layer 52 on which the portions of the photoresist layer 58 are not disposed are removed through wet etching or dry etching. The remaining portions of the photoresist layer 58 are removed in a resist stripper (see FIG. 8E). Through such processing, the slits 55 are formed.

Figure 8F:
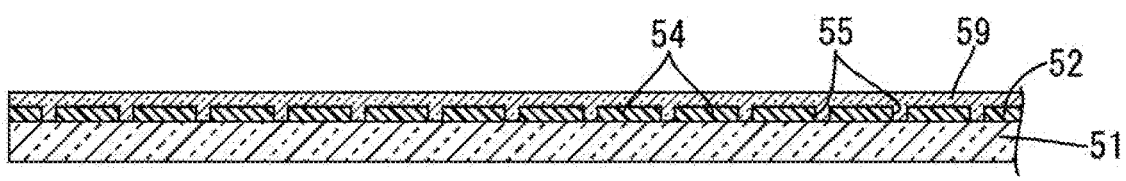
Figure 8G:
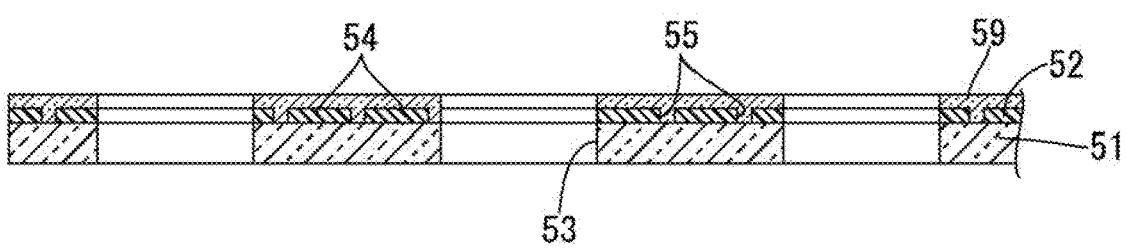

As illustrated in FIG. 8F, the protective layer 59 or the reflection enhancement layer may formed through application or bonding where appropriate. Finally, the holes 53 are formed at predefined positions by punching (see FIG. 8G). Through such processing the reflection sheet 50 in this embodiment is completed.

The reflection sheet 50 in this embodiment having such a configuration is aligned with the mounting surface 32A of the LED substrate 32 on which the LEDs 30 are not mounted such that two electrode pads 34A are exposed through each hole 43 and bonded to the LED substrate 32 with the adhesive having the heat resistance (the adhesive layer 36) (a bonding step), similar to the first embodiment. Because the LED substrate 32 is substantially flat, the general bonding machine using the roller or the jig can be used and thus they can be accurately bonded.

Next, the creamy solders 38 are applied to or printed on the electrode pads 34A exposed through the holes 53 (a solder forming step).

Each LED 30 is placed on the LED substrate 32 such that two electrodes 31 of the LED 30 are placed on the electrode pads 34A (on the solders 38) exposed through the corresponding hole 53 (a placing step) and reflow soldering is performed (a mounting step). Through the steps, a portion of the backlight unit 200 disposed in the chassis 22 in this embodiment is completed (see FIG. 4). In FIG. 4, the protective layer 59 to cover the metal reflection layer 52 is not illustrated.

The reflection sheet 50 and the backlight unit 200 in this embodiment has configurations, in addition to the configurations of the first embodiment, in which the metal reflection layer is divided into the divided reflection areas 54 by the slits 55 and two electrode pads 34A of each LED 30 are projected from the different divided reflection areas 54 and exposed through the hole 53 when viewed in plan from the reflection sheet 50 side.

In the backlight unit 200, areas between every two holes 53 are separated by the slits 55 and insulated from each other. Even if the solders 38 contact the metal reflection layer 52 exposed through the holes 53 at two or more points of the reflection sheet 50, the areas between the holes 53 are less likely to be electrically connected to each other via the metal reflection layer 52. Even if the solders 38 connected to the electrode pads 34A in each hole 53 contact the metal reflection layer 52 exposed through the hole 53, the two electrodes 31 are less likely to electrically connected to each other via the metal reflection layer 52.

According to the configuration, the holes 53 can be provided with the smaller diameter and thus exposed areas of the LED substrate 32 and the conductive pattern 34 having the lower reflectivity through the holes 53 can be reduced so that the area of the reflection sheet 50 (the metal reflection layer 52) having the higher reflectivity is increased. Namely, the light use efficiency increases and thus the brightness of the backlight unit 200 and the liquid crystal display device 100 increases.

Third Embodiment

A third embodiment will be described with reference to FIGS. 9 and 10. This embodiment includes an LED substrate and a reflection sheet applied to an edge light type backlight unit.

Figure 9:
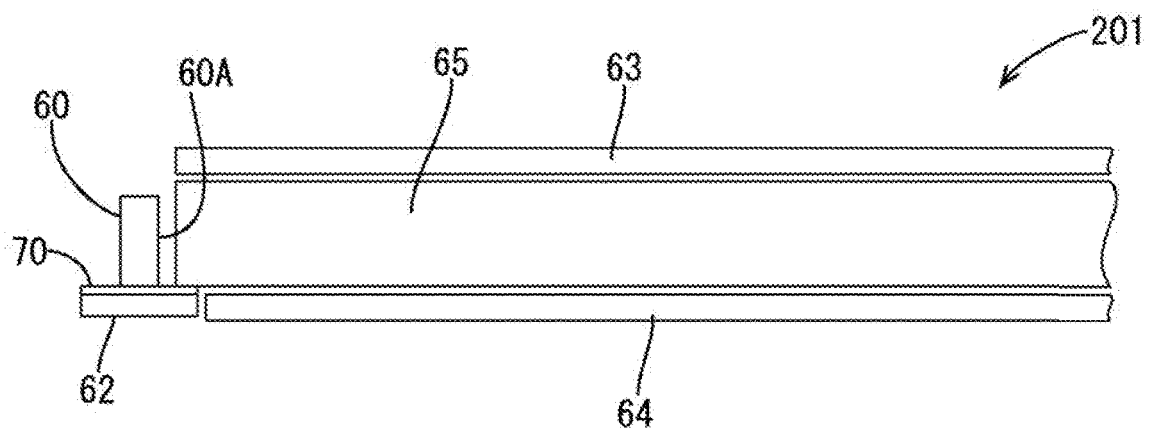
FIG. 9 a is a schematic side view of a relevant portion of a backlight unit in a third embodiment.

As illustrated in FIG. 9, a backlight unit 201 in this embodiment includes side emitting LEDs 60, an LED substrate 62, a reflection sheet 70, and a light guide plate 65. The LEDs 60 are mounted on the LED substrate 62. The reflection sheet 70 is bonded a mounting surface of the LED substrate 62. The light guide plate 65 is formed in a rectangular plate shape and configured to guide light emitted by the LEDs 60 through light emitting surfaces 60A. The light emitting surfaces 60A of the LEDs 60 are opposed to one of surfaces of the light guide plate 65. An optical member 63 in a sheet shape is disposed on a front side of the light guide plate 65. A light guide plate reflection sheet 64 is disposed on a back side of the light guide plate 65.

Figure 10:
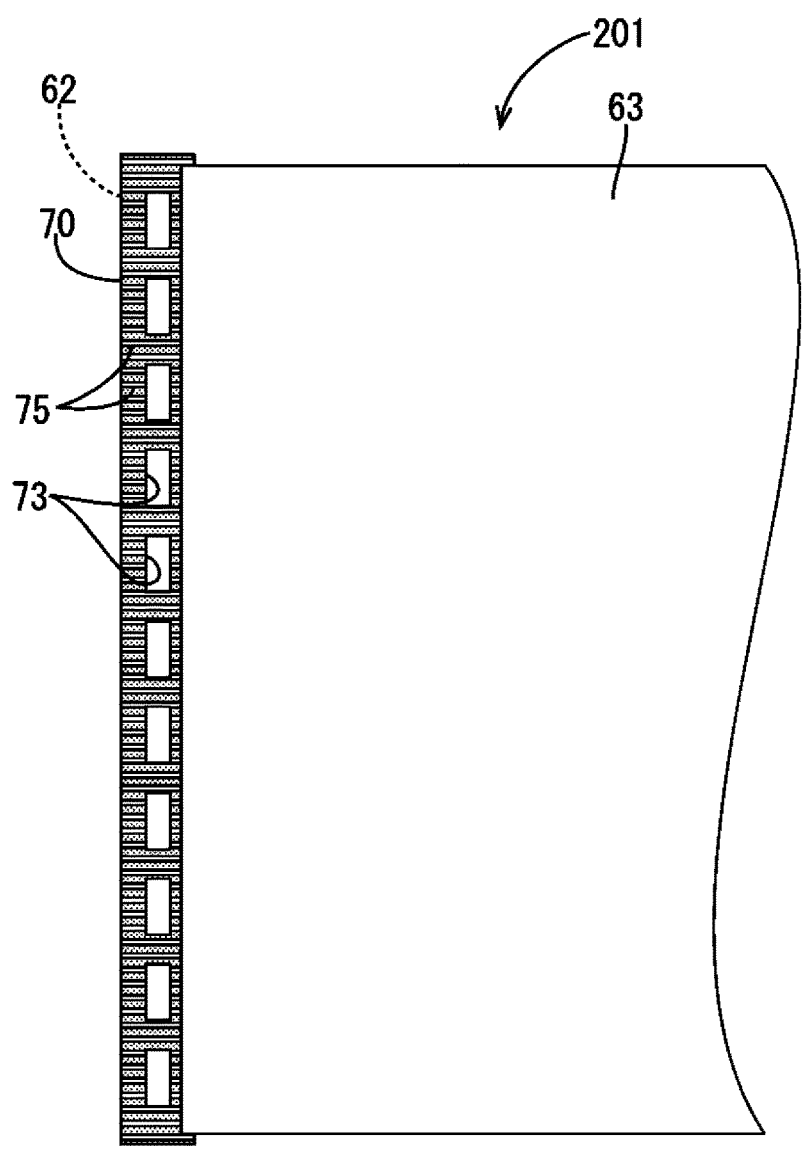
FIG. 10 is a schematic plan view of the relevant portion of the backlight unit.

As illustrated in FIG. 10, the LED substrate 62 has a band shape. The LEDs 60 are arranged in line along a longitudinal direction of the LED substrate 62 and mounted on the LED substrate 62 (the LEDs 60 are not illustrated in FIG. 10). Two electrodes of each LED 60, which are not illustrated, arranged along the longitudinal direction of the LED substrate 62 (the vertical direction in FIG. 10). Slits 75 are formed in a metal reflection layer of the reflection sheet 70 that is stacked on the LED substrate 62. The slits 75 extend in a direction perpendicular to an arrangement direction of holes 73 (the horizontal direction in FIG. 10) through which the LEDs 60 are exposed (an arrangement direction of the LEDs 60). With the slits 75, areas between the adjacent holes 73 insulated from one another. Electrode pads on which electrodes of the corresponding LEDs 60 disposed in each hole 73 are mounted are insulated from each other by the slits 75.

In such a configuration, that is, in which the LEDs are arranged in line and mounted, slits that extend in one direction may be formed or slits may be formed in a grid similar to the above embodiment.

The reflection sheet 70 is stacked on the LED substrate 62 and accurately bonded to the LED substrate 62. Furthermore, the reflection sheet 70 has the higher reflectivity because the holes 73 are small. The edge light type backlight unit 201 exerts an effect similar to the effects of the first embodiment and the second embodiment and thus the backlight unit 201 can be provided with the higher brightness.

Modification of Third Embodiment

Figure 11:
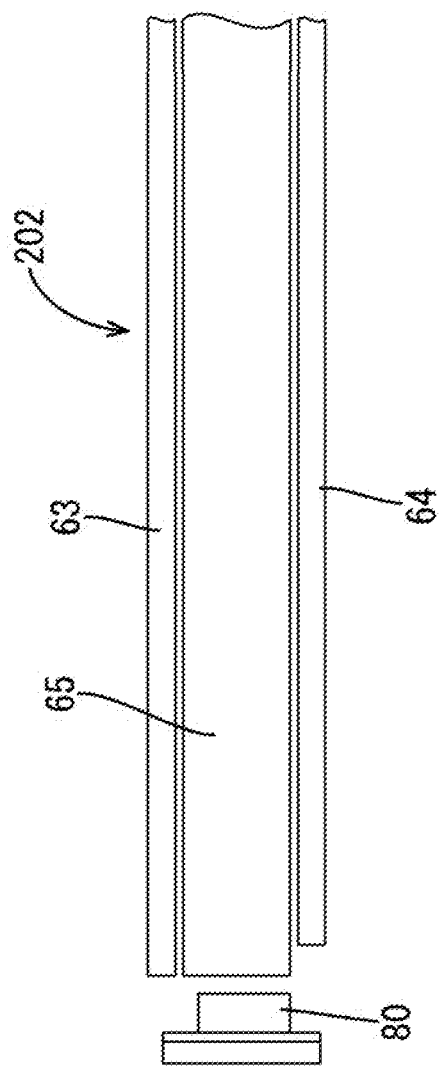
FIG. 11 is a schematic side view of a relevant portion of a backlight unit in a modification of the third embodiment.

In the third embodiment, the LEDs 60 that are the side emitting type LEDs are used in the edge light type backlight unit 201. However, an edge light type backlight unit including top emitting type LEDs 90 may be used as illustrated in FIG. 11.

Other Embodiments

The technology described herein is not limited to the embodiments described in the above descriptions and drawings. The following embodiments may be included in the technical scope of the present invention.

(1) In the first embodiment, each hole 43 has the round shape (in the plan view). However, each hole 43 may have a rectangular shape such as the hole in the third embodiment having the shape along the outline of the LED 60. Round holes are easily formed using a drill. Holes having shapes along outlines of LEDs have smaller opening areas and thus light use efficiency further improves.

(2) In the first embodiment, the reflection sheet 40 includes the insulating sheet 41 that is opposed to the LED substrate 32. However, if the insulating layer such as the protective layer 49 is formed on the surface of the metal reflection layer 42 and the insulating sheet 41 is made of a light transmissive material, the front and the rear are reversed and the metal reflection layer 42 may be opposed to the LED substrate 32.

Figure 12:
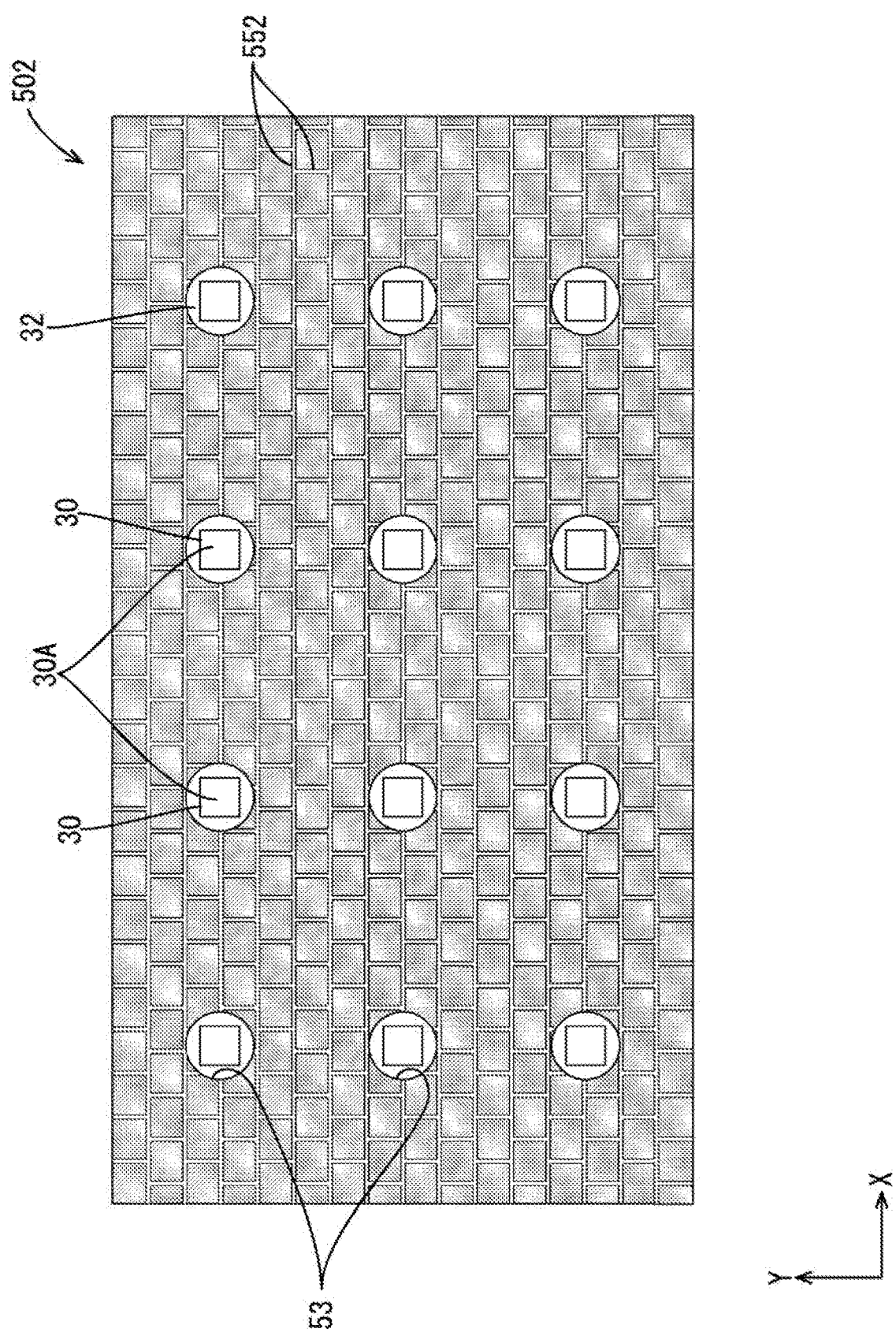
FIG. 12 is a plan view illustrating an LED substrate and a reflection sheet in another embodiment.
Figure 13:
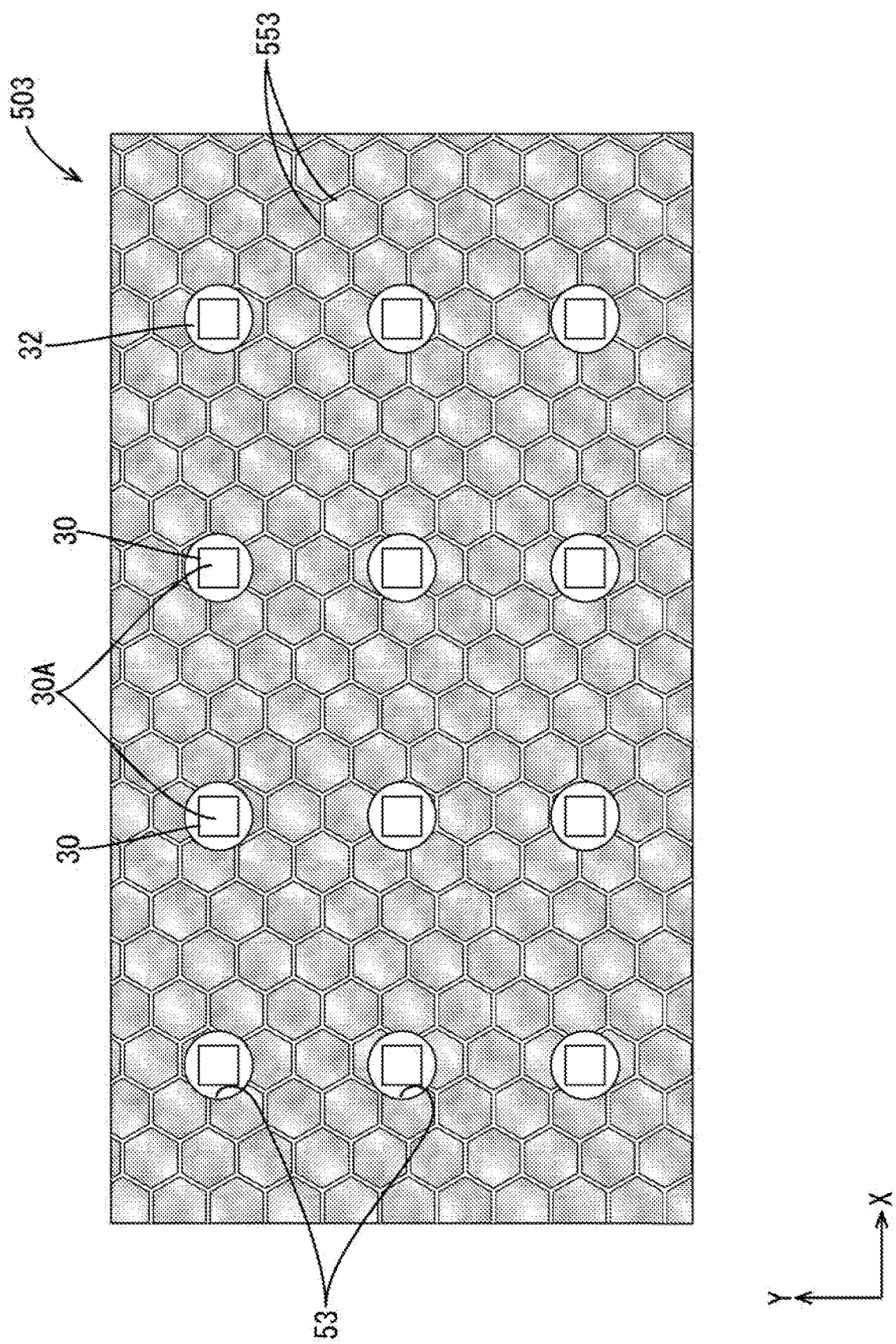
FIG. 13 is a plan view illustrating an LED substrate and a reflection sheet in another embodiment.
Figure 14:
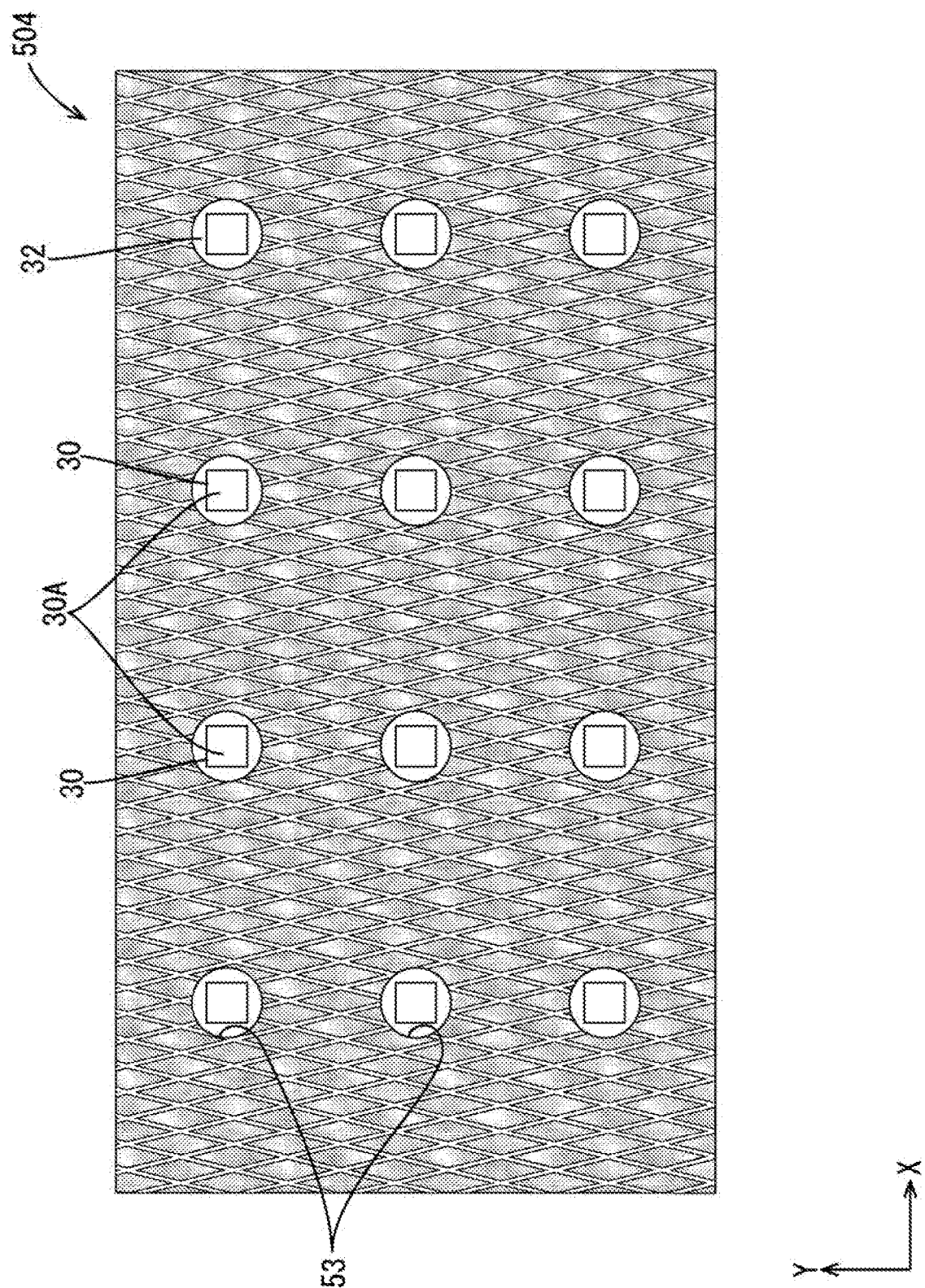
FIG. 14 is a plan view illustrating an LED substrate and a reflection sheet in another embodiment.

(3) The configurations of the slits in the reflection sheet is not limited to those of the above embodiments. A reflection sheet 502 that includes slits 552 in the same shape in the same size arranged in a brick pattern in the reflection sheet 502 as illustrated in FIG. 12, a reflection sheet 503 that includes slits 553 in regular hexagon arranged in a honeycomb pattern as illustrated in FIG. 13, a reflection sheet 504 that includes slits 554 in a diamond mesh pattern as illustrated in FIG. 14, reflection sheets that include slits in irregular patterns, and reflection sheets that include slits in various patterns may be included in the scope of the present invention. The slits can be arranged in any pattern as long as at least one slit provided between the adjacent holes 53 and the slits is formed so that at least one extending line passes between two electrode pads 34A within one hole 53 and electrical connection within the plane is reduced.

(4) In the third embodiment, the slits 75 are formed in the reflection sheet 70 in one direction. However, slits may be provided in two or more direction in a configuration in which LEDs are disposed in line.

The invention claimed is:

1. A lighting device comprising:
light sources arranged at intervals in a first direction;
a light source substrate including a plate-shaped base including a mounting surface on which the light sources are mounted with solders; and
a reflection sheet including:
an insulating sheet made of an insulating material having a heat resistance higher than a melting temperature of the solders and an elastic modulus lower than that of the plate-shaped base of the light source substrate, the insulating sheet including first through holes in which the light sources are disposed; and
a metal thin film having light reflectivity and being stacked on the insulating sheet, the metal thin film including:
second through holes in which the light sources are disposed, the second through holes communicating with the first through holes, respectively; and
slits each continuously extending in a second direction from a first edge of the metal thin film to a second edge of the metal thin film opposed to the first edge without breaks, the second direction perpendicular to the first direction, the slits being separated from each other in the first direction, each of the slits being disposed between adjacent two of the second through holes;
wherein
the light source substrate and the reflection sheet are bonded together with an adhesive layer.

2. The lighting device according to claim 1, wherein a difference between linear expansion coefficients of the plate-shaped base and the insulating sheet is smaller than 1/200/L, where L is a length of the plate-shaped base and a length of the insulating sheet.

3. The lighting device according to claim 1, wherein
the plate-shaped base is made of glass epoxy or aluminum, and
the insulating sheet is made of polyimide or liquid crystal polymers.

4. The lighting device according to claim 1, wherein
the light sources are top emitting light sources with light emitting surfaces facing an opposite side from the light source substrate, and
the metal thin film includes a reflection surface on an opposite side from the light source substrate and positioned lower than a height of the light emitting surfaces from the plate-shaped base.

5. The lighting device according to claim 1, wherein the metal thin film has a thickness in a range from 0.05 µm to 1 µm.

6. The lighting device according to claim 1, wherein the slits are arranged at equal intervals with a pitch in a range from 1.0 mm to 5.0 mm.

7. The lighting device according to claim 1 further comprising light sources arranged at intervals in the second direction, wherein
the insulating sheet includes first through holes in which the light sources arranged at intervals in the second direction are disposed,
the slits are defined as first slits,
the metal thin film includes:
second through holes in which the light sources are arranged at intervals in the second direction, the second through holes communicating with the first through holes in which the light sources arranged at intervals in the second direction are disposed, respectively;
second slits extending in the first direction from a third edge of the metal thin film to a fourth edge of the metal thin film opposed to the third edge without breaks, the second slits being separated from each other in the second direction, each of the slits being disposed between two of the second through holes that are adjacent to each other in the second direction,
divided reflection areas defined by the first slits and the second slits, and
each of the second through holes that communicates with sections of the first slits and the second slits defining at least one of the divided reflection areas different from sections of the first slits and the second slits defining another one of the divided reflection areas.

8. The lighting device according to claim 7, wherein the first slits and the second slits have widths in a range from 3 μm to 30 μm.

9. The lighting device according to claim 7, wherein the first slits and the second slits are arranged at equal intervals with a pitch in a range from 0.1 mm to 5 mm.

10. The lighting device according to claim 1 further comprising a light guide plate including a plate shaped member and an end surface through which light from the light sources enters.

11. A display device comprising:
a lighting device according to claim 1; and
a display panel.

12. A method of producing a lighting device comprising light sources, a light source substrate on which the light sources are arranged at intervals in a first direction and at intervals in a second direction perpendicular to the first direction, and a reflection sheet including through holes, the method comprising:
forming a metal thin film having light reflectivity on a surface of an insulating sheet,
forming first slits in the metal thin film to extend in the second direction from a first edge of the metal thin film to a second edge of the metal thin film opposed to the first edge,
forming second slits in the metal thin film to extend in the first direction from a third edge of the metal thin film to a fourth edge of the metal thin film opposed to the third edge,
bonding the insulating sheet to the light source substrate with an adhesive;
applying solders to sections of the light source substrate exposed through the through holes;
placing the light sources on the solders; and
mounting the light sources on the light source substrate through reflow soldering.

13. The lighting device according to claim 7, wherein
a plurality of the first slits are disposed between the second through holes adjacent to each other in the first direction, and
a plurality of the second slits are disposed between the second through holes adjacent to each other in the second direction.

* * * * *